(12) United States Patent
Sefcik et al.

(10) Patent No.: US 8,500,594 B2
(45) Date of Patent: Aug. 6, 2013

(54) DIFFERENTIAL ASSEMBLY AND METHOD FOR MANUFACTURING SAME

(75) Inventors: Michael Sefcik, Linden, MI (US); Jeff Lubben, Hudson, IA (US); Robert Veldman, Brighton, MI (US)

(73) Assignee: Metaldyne Company LLC, Plymouth, MI (US)

( * ) Notice: Subject to any disclaimer, the term of this patent is extended or adjusted under 35 U.S.C. 154(b) by 838 days.

(21) Appl. No.: 12/288,230

(22) Filed: Oct. 17, 2008

(65) Prior Publication Data

US 2009/0105031 A1    Apr. 23, 2009

(51) Int. Cl.
*B22F 7/00*    (2006.01)

(52) U.S. Cl.
USPC ............................ 475/221; 29/428

(58) Field of Classification Search
USPC .......................................... 475/221
See application file for complete search history.

(56) References Cited

U.S. PATENT DOCUMENTS

| | | |
|---|---|---|
| 1,226,854 A | 5/1917 | Bower |
| 1,308,614 A | 7/1919 | Baldock |
| 2,720,797 A | 10/1955 | Huddleston et al. |
| 3,310,999 A | 3/1967 | Griffith |
| 3,651,713 A | 3/1972 | Mueller |
| 3,955,443 A | 5/1976 | Estrada |
| 4,363,248 A | 12/1982 | Brisabois |
| 4,722,244 A | 2/1988 | Tsuchiya et al. |
| 4,848,183 A | 7/1989 | Ferguson |
| 4,901,599 A | 2/1990 | Irwin |
| 4,959,043 A | 9/1990 | Klotz et al. |
| 5,098,358 A * | 3/1992 | Igaku ............................ 475/335 |
| 5,346,442 A * | 9/1994 | Eastman ........................ 475/223 |
| 5,718,653 A | 2/1998 | Showalter |
| 6,045,479 A | 4/2000 | Victoria et al. |
| 6,061,907 A | 5/2000 | Victoria et al. |
| 6,117,038 A * | 9/2000 | Nishiji et al. .................. 475/221 |
| 6,254,505 B1 | 7/2001 | Forrest |
| 6,561,945 B2 * | 5/2003 | Shattuck et al. ............... 475/331 |
| 6,945,898 B2 | 9/2005 | Szuba |
| 7,025,702 B2 | 4/2006 | Saito et al. |
| 7,025,704 B2 * | 4/2006 | Yasuda et al. ................. 475/323 |
| 7,155,997 B2 | 1/2007 | Santelli |
| 7,947,219 B2 * | 5/2011 | Imazato et al. .................... 419/5 |
| 7,988,583 B2 * | 8/2011 | Hirase ........................... 475/225 |
| 2004/0116235 A1 | 6/2004 | Szuba |
| 2005/0070394 A1 | 3/2005 | Sugeta et al. |
| 2007/0154338 A1 * | 7/2007 | Sathian et al. ...................... 419/5 |
| 2009/0280946 A1 * | 11/2009 | Matsuda et al. .............. 475/230 |
| 2010/0105515 A1 * | 4/2010 | Goleski et al. ................ 475/341 |

* cited by examiner

*Primary Examiner* — Sherry Estremsky
(74) *Attorney, Agent, or Firm* — McDonald Hopkins LLC

(57) ABSTRACT

A differential assembly and method of manufacturing such an assembly are provided. A method for manufacturing a differential assembly includes forming a first portion of a differential carrier; forming a second portion of the differential carrier; securing the first portion to the second portion to form the differential carrier; forming a differential housing; and securing the differential carrier to the differential housing to form a differential assembly. A sintering process may be used to form the first portion and second portion of the differential carrier, and the first and second portions may be secured together by a brazing process. The forming of the first and second portions of the differential carrier and the securing of the first and second portions to form a differential carrier may be achieved by a sinter-brazing process.

5 Claims, 5 Drawing Sheets

DIFFERENTIAL ASSEMBLY AND METHOD FOR MANUFACTURING SAME

CROSS-REFERENCE TO RELATED APPLICATIONS

This application claims priority from U.S. Provisional Patent Application No. 60/999,259 titled "DIFFERENTIAL CARRIER AND METHOD FOR MANUFACTURE SAME," filed on Oct. 17, 2007, which is hereby incorporated by reference in its entirety.

FIELD OF THE INVENTION

The present invention relates generally to differential assemblies and methods for manufacturing the same. More particularly, the present invention relates to multiple-piece differential carriers attached to differential housings to form differential assemblies and methods for manufacturing the same.

BACKGROUND OF THE INVENTION

Differential assemblies are generally known in the automotive industry as devices that supply equal torque to a pair of driving wheels, while allowing each wheel to rotate at different speeds. Generally, differential assemblies have three primary tasks: (1) to direct the engine power to the wheels; (2) to serve as the final gear reduction to slow the rotational rate of the drive shaft before transmitting power to the wheels; and (3) to transmit power to the wheels while also allowing the wheels to rotate at different rates.

In a typical automotive vehicle, a rotating drive shaft engages a ring gear mounted to a differential housing. The drive shaft engages and drives the ring gear to rotate the differential housing. A typical differential housing contains two side gears and several pinion gears. The pinion gears are fixed to the housing by pinion shafts so that the rotating housing drives the pinion gears. The pinion gears drive side gears, each of which is coupled to a corresponding axle shaft of a driven wheel. Thus, the differential is capable of driving a pair of wheels with equal force, while allowing them to rotate at different speeds.

A differential housing is usually integrally formed with a differential carrier. Typically in four-wheel drive applications, for example, the differential carrier and the differential housing are manufactured from a one-piece casting process, which is expensive and requires use of cores and specialized finishing operations.

It is therefore advantageous to develop a lower cost differential assembly and method of manufacturing the same. In addition, it is advantageous to manufacture a multiple piece differential assembly, such as a two-piece differential carrier and a separate differential housing that is less expensive, may accommodate variations, and is simpler to produce. For example, it would be advantageous to have a differential assembly that is capable of accommodating all wheel drive applications as well as different numbers and sizes of pinion shafts and gears.

SUMMARY OF THE INVENTION

A differential assembly and method of manufacturing such an assembly are provided. A method for manufacturing a differential assembly includes forming a first portion of a differential carrier; forming a second portion of the differential carrier; securing the first portion to the second portion to form the differential carrier; forming a differential housing; and securing the differential carrier to the differential housing to form a differential assembly. A sintering process may be used to form the first portion and second portion of the differential carrier, and the first and second portions may be secured together by a brazing process. The forming of the first and second portions of the differential carrier and the securing of the first and second portions to form a differential carrier may be achieved by a sinter-brazing process.

DESCRIPTION OF THE DRAWINGS

Objects and advantages together with the operation of the invention may be better understood by reference to the following detailed description taken in connection with the following illustrations, wherein like numerals indicate like elements throughout, and wherein.

DETAILED DESCRIPTION

While a present differential assembly is described with reference to several embodiments described herein, it should be clear that the present invention should not be limited to such embodiments. Therefore, the description of the embodiments provided herein is illustrative of the present invention and should not limit the scope of the invention as claimed.

Figure 1:
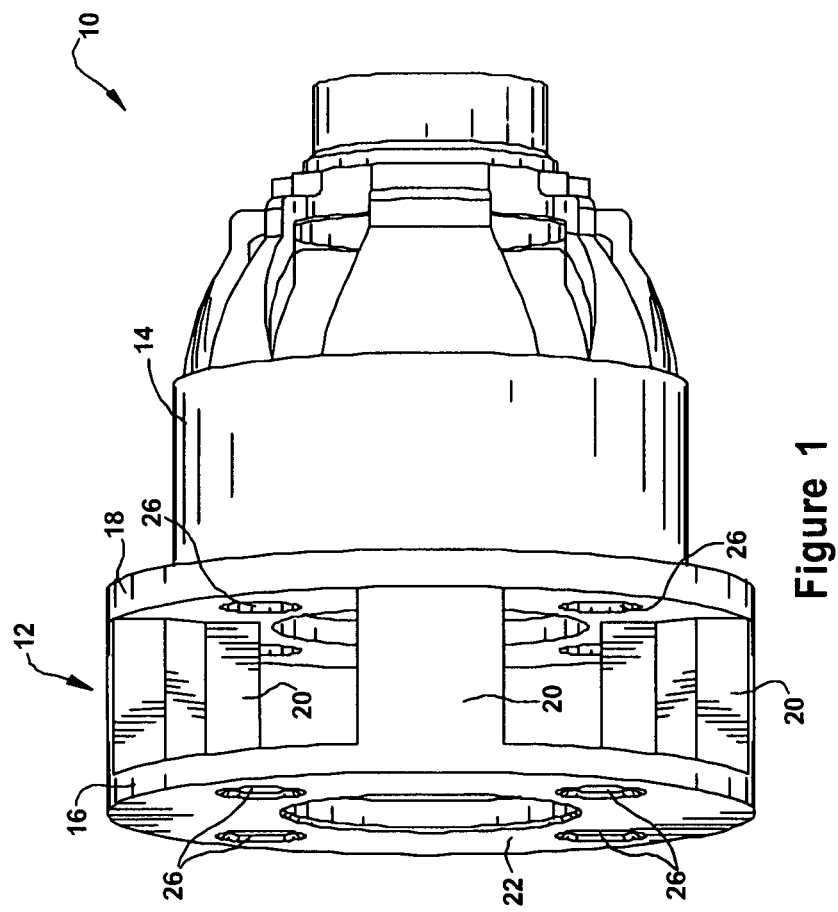
FIG. 1 illustrates a perspective view of a differential assembly.

An exemplary embodiment of a differential assembly 10 is illustrated in FIG. 1. The differential assembly 10 includes a differential carrier 12 and a differential housing 14. In a preferred embodiment, the differential carrier 12 is comprised of multiple portions or components. For example, in an embodiment, the differential carrier 12 includes a first portion 16 and a second portion 18. As seen in FIG. 1, the first portion 16 may be a planetary carrier body and the second portion 18 may be a planetary carrier cap. The planetary carrier body 16 may include a series of integral legs 20 extending from a face plate 22. As will be discussed further, in such an arrangement, the free ends of the legs 20 may be attached or otherwise secured to the carrier cap 18 to form the differential carrier 12.

In other embodiments, a differential carrier may include more than two components that are attached or secured together to form a differential carrier. For example, the differential carrier 12 illustrated in FIG. 1 may be arranged so that the carrier cap 18, the face plate 22, and each leg 20 are individual components. In such an arrangement, the legs 20 may be secured on a first end to the face plate 22 and secured on a second end to the carrier cap 18 to generally form the differential carrier 12 illustrated in FIG. 1. It will be readily understood by those of ordinary skill in the art that a differential carrier may be arranged in a variety of configurations and arrangements, and the examples or embodiments disclosed herein are intended as exemplary embodiments.

In an embodiment, the carrier body 16 and the carrier cap 18 may be manufactured from a variety of materials as will be appreciated by one of ordinary skill in the art. For example, the carrier body 16 and the carrier cap 18 may be formed from powdered metal. In such an arrangement, a sintering process may be used to fabricate, manufacture, or otherwise produce a carrier body 16 and a carrier cap 18 from powdered metals. In such an embodiment, a majority of the features of the differential carrier 12 are formed during the powdered metal sintering process. Sintering processes often provide for generally refined or nearly precise features such as apertures, contours, edges, and the like. Therefore, the use of sintering to form components for a differential carrier may be minimal or even eliminate the need for finishing or machining processes to complete the differential carrier components. In other embodiments, the carrier body 16 and the carrier cap 18 may be cast, injection molded or formed by other processes as will be appreciated by one of ordinary skill in the art. In each of these processes, the majority of the features of a differential carrier 12 may be formed during processing leaving little or no need for finishing or machining processing to complete the differential carrier components.

In a preferred embodiment, differential carrier components may be sintered and brazed together to form the differential carrier 12. In one example, the differential carrier components are first sintered to form complete components and then undergo a brazing process to attach the components together to form a differential carrier. In another example, the carrier components are generally sintered and brazed through a single process to form a differential carrier.

In one embodiment, the carrier body 16 and the carrier cap 18 are first sintered individually to form the body 16 and cap 18 and subsequently brazed together to form a carrier housing 12. In such a process, after the body 16 and cap 18 are individually formed by sintering, the legs 20 of the carrier body 16 are positioned in close proximity or in contact with a surface of the carrier cap 18. Brazing compound or material such as filler metal or an alloy is placed between the free ends of the legs 20 and the surface of the carrier cap 18. The temperature is sufficiently raised so that the brazing material melts and flows between the legs 20 and carrier cap surface to secure the body 16 and cap 18 together to form the differential carrier 12.

In another embodiment, the carrier body 16 and carrier cap 18 may be attached or otherwise secured together while the components are being formed through a sinter-brazing process. For example, after the body 16 and carrier cap 18 are press-formed from powdered metal, the body 16 is positioned such that the legs 20 are positioned in close proximity or in contact with a surface of the carrier cap 18. Brazing compound or material is placed in the joint between the free ends of the legs 20 and the surface of the carrier cap 18. The body 16 and the cap 18 are placed in a sintering furnace where sintering and brazing occurring in the same process step, resulting in the body 16 and cap 18 being secured together to form the differential carrier 12.

Figure 2:
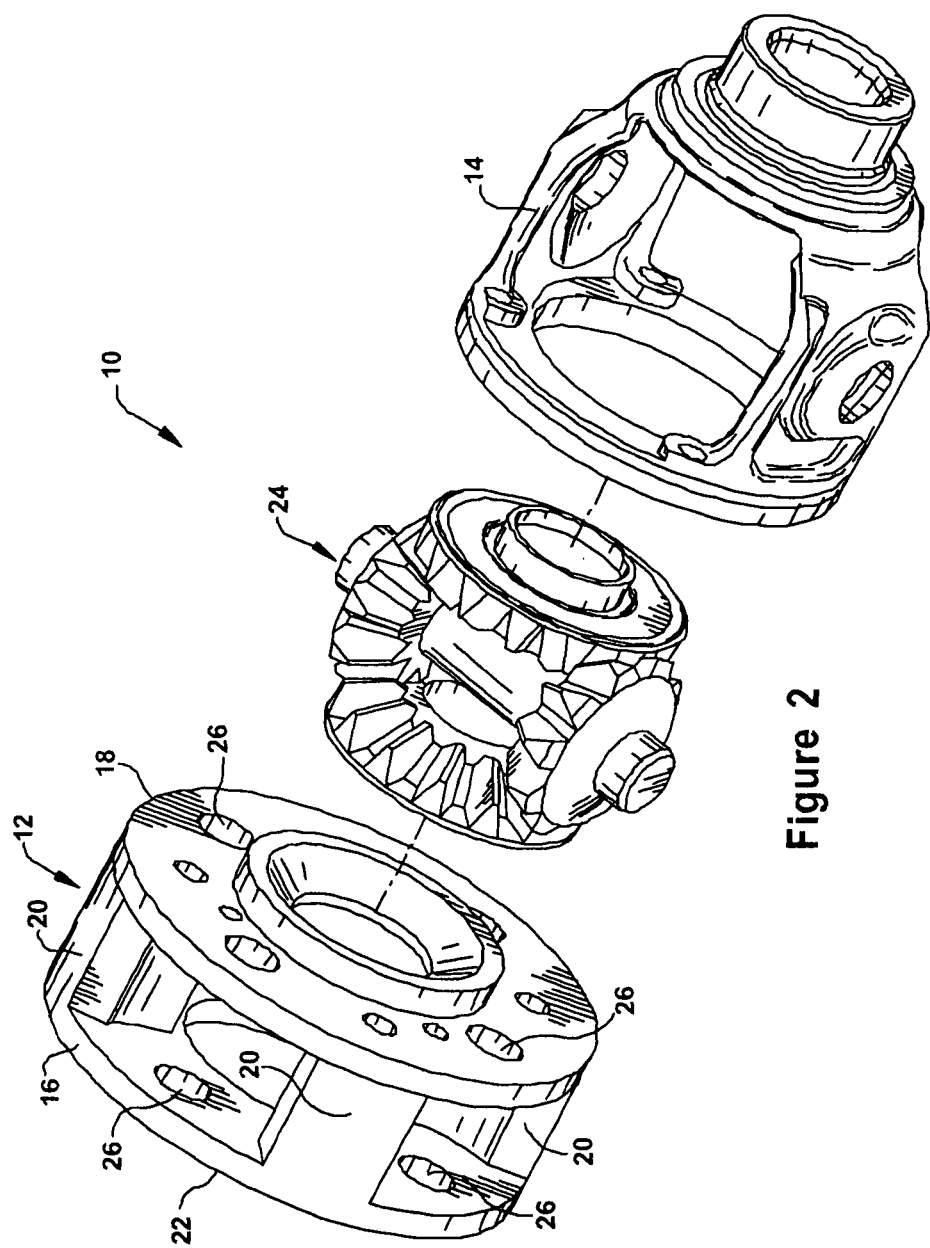
FIG. 2 illustrates a exploded perspective view of a differential assembly.

In an embodiment, the differential housing 14 is arranged to be secured to the differential carrier 12 to form the differential assembly 10. FIG. 2 illustrates an exploded view of a differential assembly 10 including the differential carrier 12, the differential housing 14, and a differential gear assembly 24 that is positioned within the housing 14 upon assembly. The differential housing 14 may be made of various materials as will be appreciated by one of ordinary skill in the art. For example, the differential housing 14 may be made of powdered metal, a metal alloy or any suitable metal, such as iron. In various embodiments, the differential housing 14 may be formed through casting, sintering, injection molding, or other such processes. Such processes may eliminate the need for cores in the forming of the housing 14.

Figure 3:
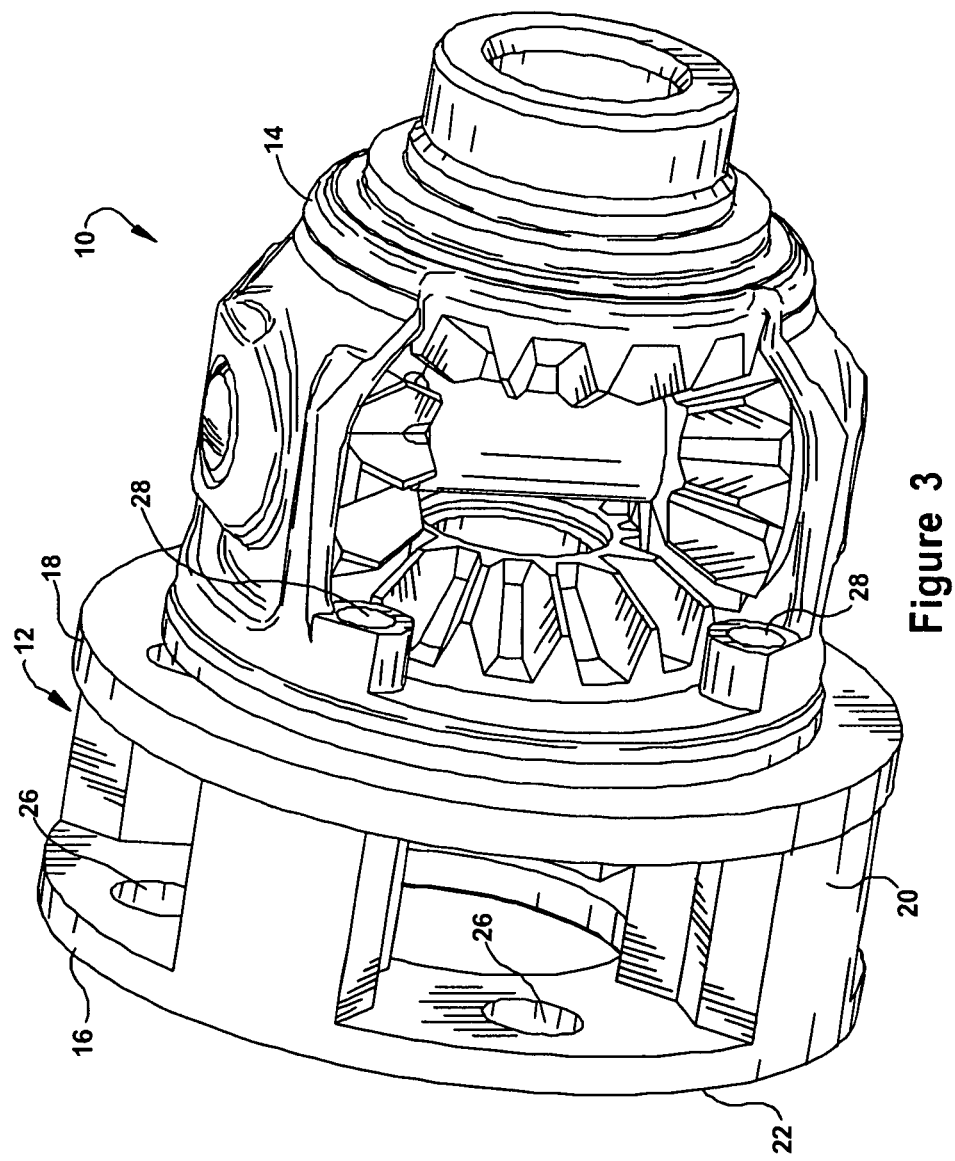
FIG. 3 illustrates a perspective view of a differential assembly with a portion of a differential housing cut away.
Figure 4:
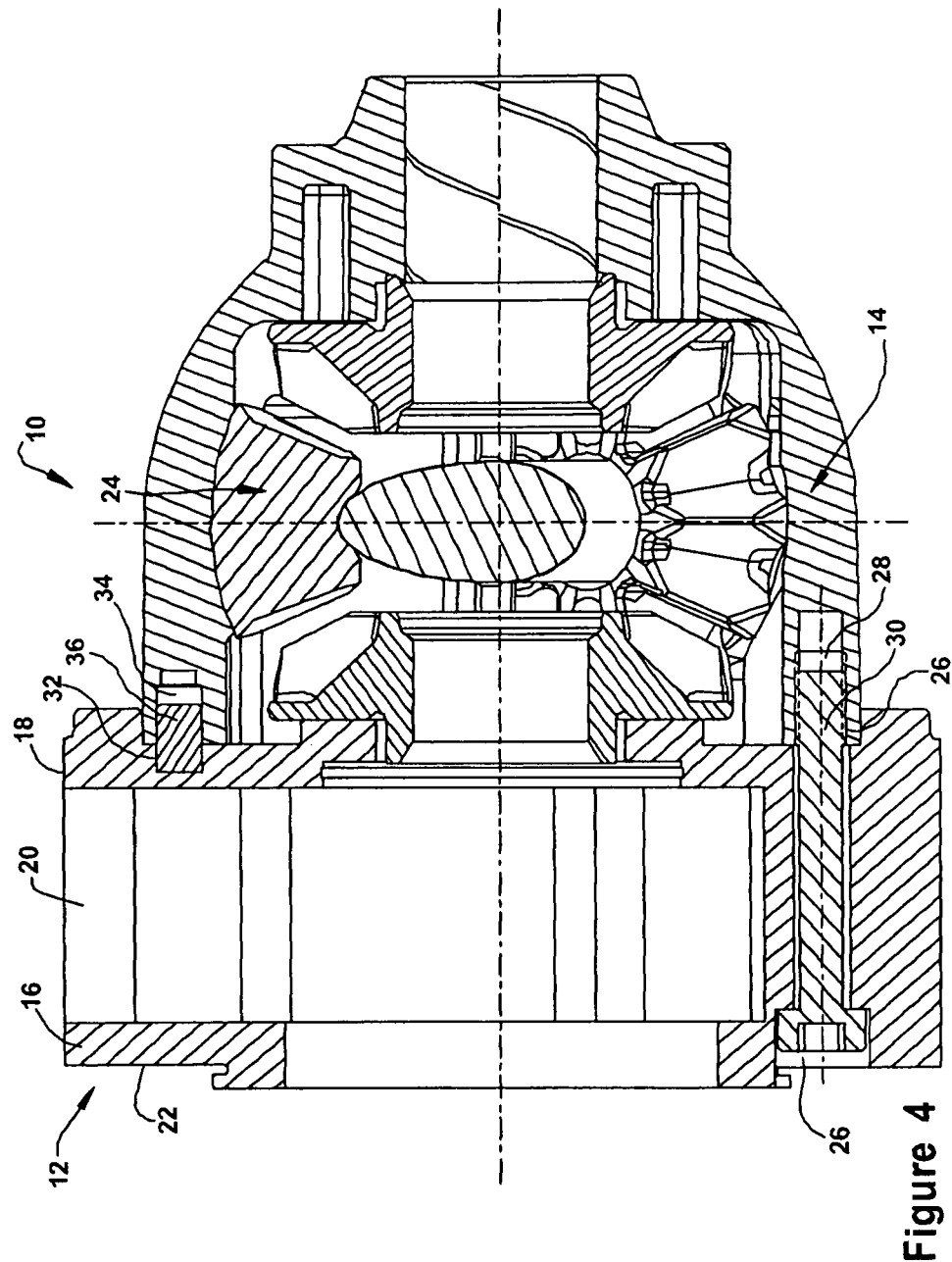
FIG. 4 illustrates a cross-sectional view of a differential assembly.

The differential housing 14 and carrier 12 may be secured together through a number of methods to form the differential assembly 10. In a preferred embodiment, the carrier 12 and housing 14 may be attached through mechanical means. In one example, the differential carrier 12 includes a series of bores 26 (as seen in FIG. 4) and the differential housing 14 includes a series of matching apertures 28 (as best seen in FIG. 3). For the series of bores 26 in the carrier 12, the bore may pass completely through the carrier 12, including through the carrier body 16 and the carrier cap 18. In one embodiment, the a bore 26 passes through the face plate 22, a leg 20, and the cap 18, where as the bore 26 may be accessed through either the face plate 22 or the cap 18.

As best seen in FIG. 4, the differential housing 14 may be positioned in contact with the differential carrier 12 so that the housing apertures 28 align with the carrier bores 26. In such an arrangement, mechanical fasteners may be positioned to engage both the housing 14 and the carrier 12 so that the housing 14 and carrier 12 are secured together. In one embodiment, a bolt 30 is passed through a carrier bore 26 and through a housing aperture 28. In such an arrangement, the housing aperture 28 and bolt 30 may both include threads so that the bolt 30 may be reversibly secured in the housing aperture 28. The carrier bore 26 may include a shoulder to engage with a head of the bolt to further facilitate securing the carrier 12 to the housing 14. It will be understood that the carrier 12 and housing 14 may be arranged such that a bolt may first pass through an aperture in the housing 14 and engage a threaded bore in the carrier 12 to secure the housing 14 and the carrier 12. In such an arrangement, the housing aperture 26 may include a shoulder to engage with a head of the bolt. In addition, a bolt and nut arrangement may be used to secure the housing 14 to the carrier 12.

With reference to FIG. 4, in another embodiment a carrier bore 32 only passes partially through the carrier cap 18. The housing 14 includes a matching aperture 34. In such an arrangement a dowel pin 36 or other such fastener may be inserted into the carrier bore 32 and the housing aperture 34 to secure the two together. The dowel pin 36 may engage the bore 32 and aperture 34 through a friction fit, or a bonding agent may secure the dowel pin 36. Although the description and figures describe the housing and carrier as being secured through bolts or dowel pins, it will be understood that the components may be secured through a variety of mechanical means such as, for example, rivets, screws, pegs, alternative arrangements of bolts, and the like. In addition, other methods may be used to secure the carrier and the housing. For example, the carrier and housing may be secured together through welding, bonding, brazing, sinter-brazing, and the like. Methods and apparatus for securing the carrier 12 and housing 14 are designed so that the differential assembly 10 may withstand and support the torsional and axial loads placed on the differential assembly 10 by the drive shaft.

In an exemplary embodiment of a method for manufacturing or forming a differential assembly 10, a carrier body 16 and a carrier cap 18 are formed from powdered metal by a sintering process. The carrier body 16 and carrier cap 18 are positioned adjacent to each other and brazed to form the differential carrier 12. The differential housing 14 is formed by casting and is attached to the differential carrier 12 by a series of fasteners 30, 36. In an embodiment, a carrier body 16 and carrier cap 18 are formed from powdered metal and secured together through a sinter-brazing process to form a differential carrier 12. In an embodiment, the carrier body 16 and carrier cap 18 are sinter-brazed together with the differential housing 14 to form the differential assembly 10. In an embodiment, a sintered and brazed differential carrier 12 is brazed to a differential housing 14. In such an embodiment, the differential housing 14 may be temporarily secured to the carrier cap 18 through a series of dowel pins 36 prior to brazing. The differential assembly 10 or individual components may undergo a finishing or machining process to complete the differential assembly 10 or any individual components.

Figure 5:
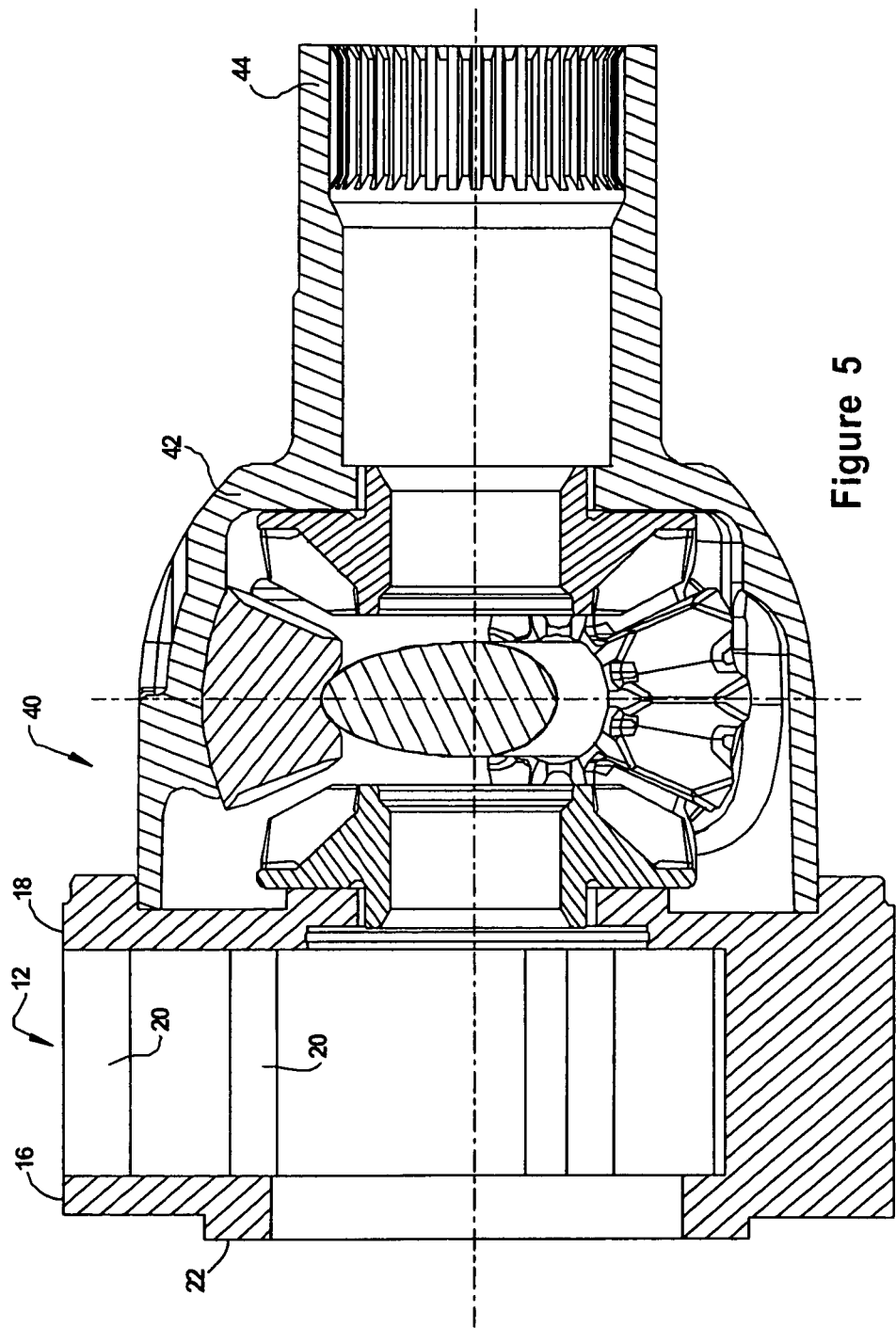
FIG. 5 illustrates a cross-sectional view of a differential assembly.

The differential housing 14 may have a predetermined size and shape corresponding to, for example, the number and size of pinion gears or side gears to be housed in the housing 14. In addition, the embodiments disclosed herein allow for an all wheel drive implementation. For example, as seen in FIG. 5, a differential assembly 40 may include a differential carrier 12 and a differential housing 42 that is arranged to accommodate a spline 44 on the housing. It will be understood that the spline may be an internal spline or an external spline. In addition, the differential assembly 10, 40 may include any method of engaging with the output shaft. As seen in FIG. 5, one method of securing the housing 42 to the carrier 12 is through the inclusion of a split ring to mechanically secure the components together. In such an arrangement, the housing 42 may be splined and the carrier 12 may be splined. Such splines may be utilized to transfer torque between the housing 42 and carrier 12. It will also be readily understood that embodiments disclosed herein may allow for variations in designs and uses of a differential assembly to reduce manufacturing costs and increase the ease of assembling a differential assembly.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A method of forming a differential assembly comprising:
   forming a differential carrier including the steps:
      sintering powder metal to form a unitary carrier body having a generally planar surface and a plurality of legs extending from the surface;
      sintering powder metal to form a cap having a generally planar surface;
      securing the cap to the unitary carrier such that the generally planar surface or the cap is arranged substantially parallel to the generally planar surface of the carrier body; and
   brazing a differential housing to the differential carrier.

2. The method of claim 1 where:
   the differential carrier further includes a first aperture;
   the differential housing further includes a second aperture; and
   the differential assembly further includes a fastener positioned at least partially in the first aperture and second aperture.

3. The method of claim 1, further comprising applying a brazing material layer between the first sintered portion and the second sintered portion.

4. The method of claim 1, further comprising the step of sintering powder metal to form the differential housing.

5. The method of claim 1 wherein the differential assembly further comprises a spline.

\* \* \* \* \*